Jan. 12, 1926. 1,569,543
H. O. HEM
DYNAMOMETER
Filed Feb. 25, 1920 3 Sheets-Sheet 1
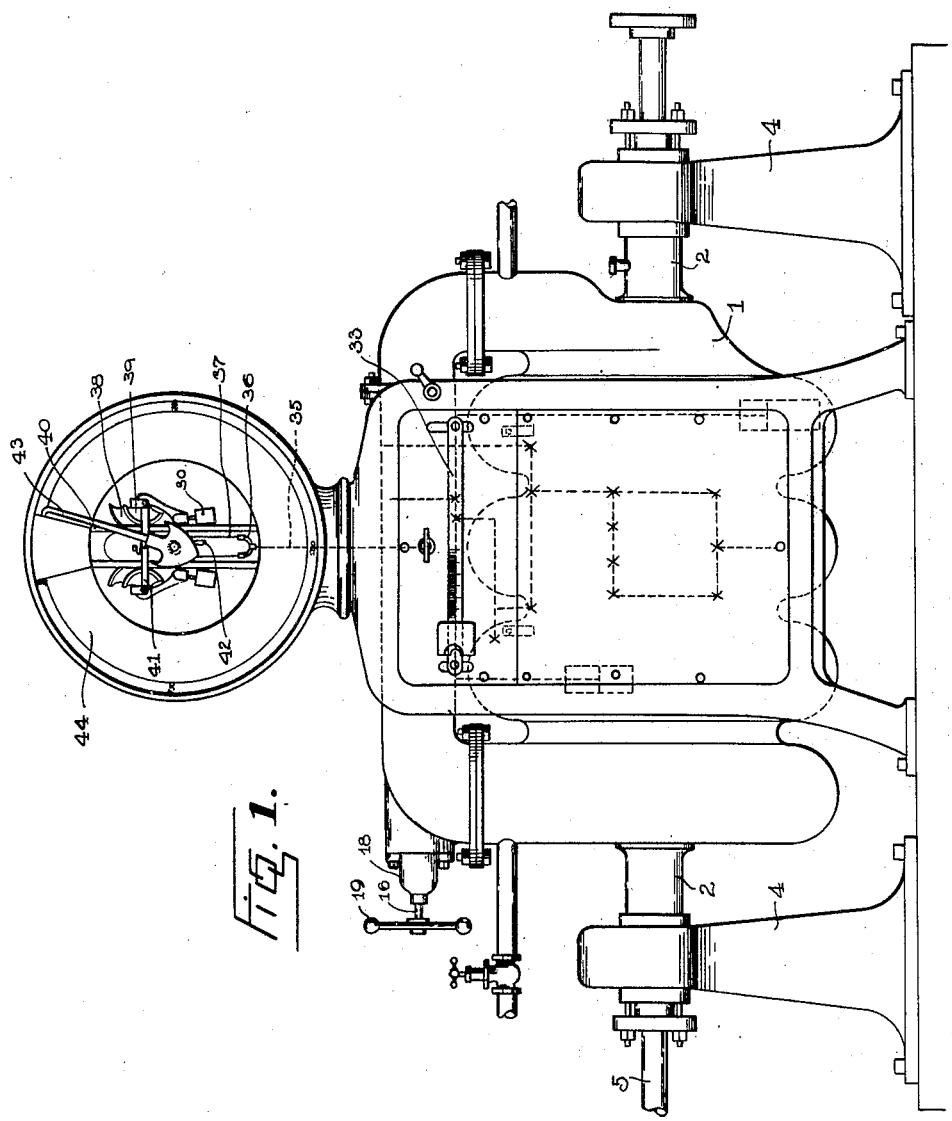
Inventor
HALVOR O. HEM.
Witness
By George R. Frye
Attorney

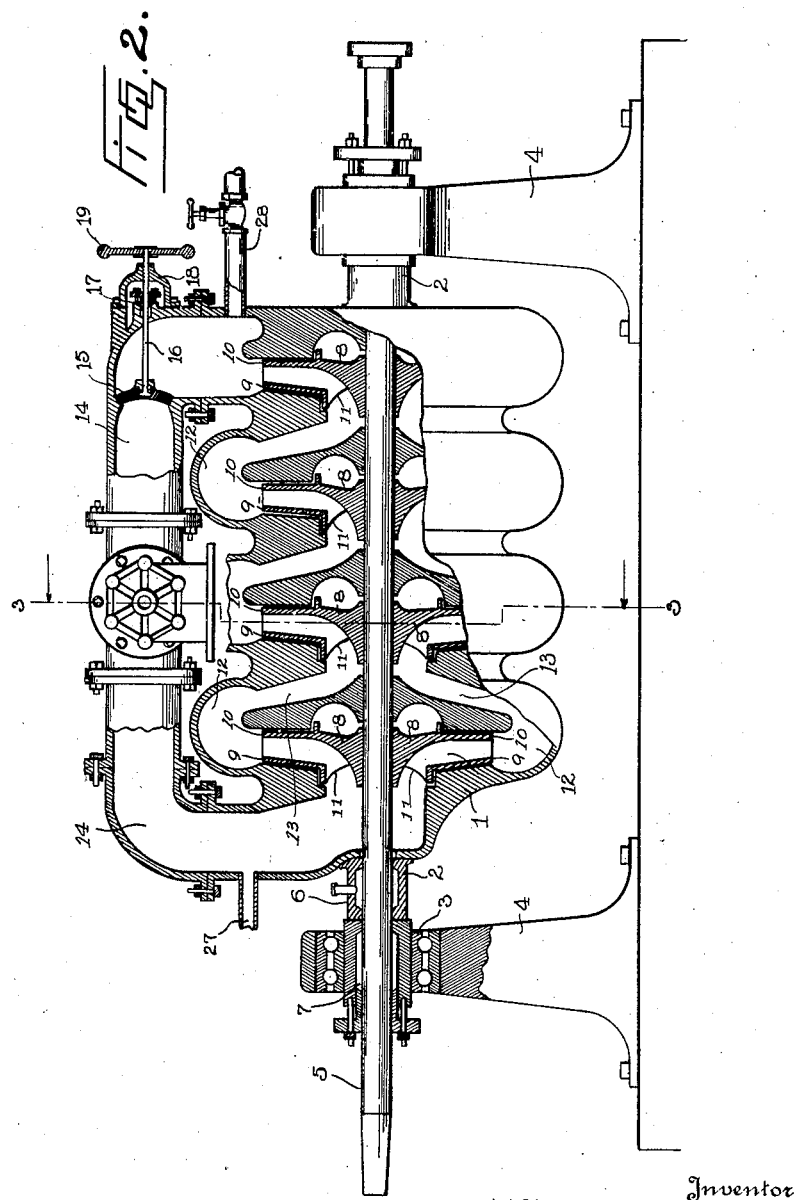

Jan. 12, 1926. 1,569,543
H. O. HEM
DYNAMOMETER
Filed Feb. 25, 1920 3 Sheets-Sheet 3
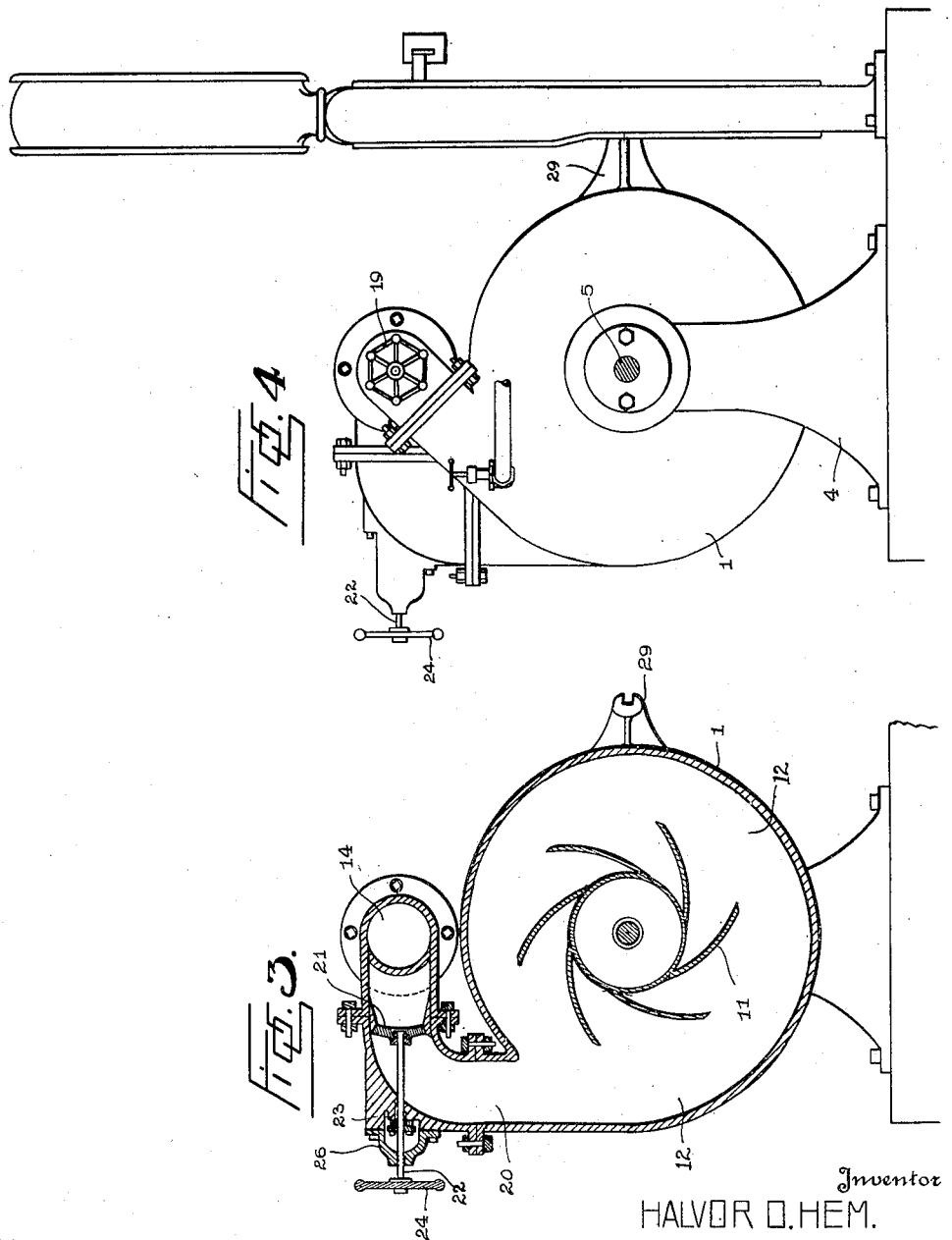
Inventor
HALVOR O. HEM.
Witness
C. E. Wilcox
By George R. Frye
Attorney Patented Jan. 12, 1926.

1,569,543

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

DYNAMOMETER.

Application filed February 25, 1920. Serial No. 361,255.

*To all whom it may concern:*

Be it known that I, HALVOR O. HEM, a citizen of the United States, residing at Toledo, in the county of Lucas and State of Ohio, have invented certain new and useful Improvements in Dynamometers, of which the following is a specification.

This invention relates to machines for use in testing the power exerted by prime movers, and has for its object the provision of a device of this kind in which the torque transmitting medium is a fluid confined within a rotatably mounted multi-stage pump casing with valves so arranged that the resistance of the fluid to rotation of rotors contained in said casing may be increased or decreased at will by checking the flow of the fluid or cutting out some of the pump stages.

Another object of the invention is to provide a dynamometer having fluid torque transmitting means combined with a pendulum resisting means and an index to show the amount of torque exerted by a revolving shaft connected to said dynamometer.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of a dynamometer embodying my invention;

Figure 2 is a view, partly in front elevation and partly in vertical section, of a fluid torque transmitting device entering into my invention;

Figure 3 is a transverse vertical section on the line 3—3 of Figure 2; and

Figure 4 is a side elevation of the dynamometer shown in Figure 1.

Referring to the drawings in detail, the casing 1 of a centrifugal pump forming part of the combination constituting my invention is provided at its ends with trunnions 2 each of which is rotatably mounted through the medium of a suitable ball race 3 in a stationary bearing stand 4. The trunnions 2 are axially bored to receive the rotor shaft 5 adapted to be coupled to the machine to be tested and which is journalled in bearings 6 of babbitt or other suitable metal contained in internal annular grooves in the trunnions 2. The trunnions are also provided with stuffing boxes 7 to prevent leakage around the shaft 5. The bearings may, if desired, be located outside the stuffing boxes instead of inside as shown.

Fixed upon the shaft 5 is a series of rotors 8 having front walls 9, rear walls 10, and a series of spiral blades 11 which divide the spaces between the front walls 9 and rear walls 10 into spiral passages leading from the centers to the peripheries of the rotors 8. The walls 9 do not extend entirely to the hubs of the rotors, so that intake openings are left at the inner ends of the spiral passages. The outer ends of the passages open through the peripheries of the rotors into circular chambers 12 in the casing 1. Each of the first three chambers communicates through a conical passage 13 with the intake opening in the succeeding rotor, and the last of the chambers communicates through a large pipe 14 with the central intake openings of the first rotor.

Supposing the casing to be filled with water and the shaft 5 coupled to an automobile engine or other source of power, if the casing 1 be free to rotate the entire device will revolve as a unit. If, however, the casing 1 be held, the water in each of the rotors will be thrown out of it into the corresponding chamber 12 and thence be forced inwardly to the intake opening of the succeeding rotor in the cycle. Even though the passages be unobstructed, some resistance is offered to the flow of liquid in the device, and this results in pressure urging the casing to revolve with the shaft and in equal back pressure resisting the rotation of the rotors.

I have provided a valve 15 by means of which the pressure within the casing may be regulated when desired. The valve 15 is located in the large pipe 14 and is provided with a stem 16 which extends through the casing. A stuffing box 17 prevents leakage around the stem, and the outer end of the stem is threaded through a boss in a yoke member 18 detachably bolted to the casing to give free access to the stuffing box 17. The stem is rotatable with respect to the valve 15 and is provided at its other end with a hand wheel 19 so that it may be readily turned. Turning up the valve 15 and thereby reducing the area of the opening is equivalent in effect on the pump rotors to increasing the head against which the pump works.

For the purpose of enabling the operator to reduce the resistance offered by the device when desired, I have provided a by-pass 20 leading from the second chamber 12 to the large pipe 14 (see Figure 3). A valve 21 similar in all respects to the valve 15 and having a like stem 22, stuffing box 23 and operating wheel 24, is located within the by-pass, the stem being threaded in a boss formed upon a member 26 similar to the member 18. By opening the valve 21 the water passes from the second chamber 12 to the large pipe 14, and two of the rotors are thereby short-circuited with respect to the others.

Supply and drain pipes 27 and 28 are provided at opposite ends of the casing. These pipes are provided with valves which may be closed when the machine is in operation.

A lug 29 is formed on one side of the casing 1 and is suitably connected to the load-offsetting mechanism of an automatic scale of the pendulum type. Since the force resisting and measuring mechanism used in the illustrated embodiment of the invention is well known and is shown and described in the patent to Hapgood No. 1,203,611, Nov. 7, 1916, I will describe it and outline its action only in such detail as will suffice to show the co-operation of the force resisting and measuring mechanism with the hydraulic torque transmitting device described above.

The load-offsetting mechanism comprises a pair of oppositely-swinging pendulums 30 which are swung upwardly and outwardly by the downward force exerted by the lug 29 upon the lever 33 from which a steelyard 35 extends upwardly to an equalizer 36 connected through the medium of steel ribbons 37 to power sectors 38 of the pendulums 30. The pendulums 30 are provided with fulcrum sectors 39 suspended from the frame of the scale by ribbons similar to the ribbons 37. The fulcrum sectors are guided in their upward movements by the frame members 40 between which and the fulcrum sectors the supporting ribbons lie. A compensating bar 41 connects the pendulums and moves upwardly with them, and connected to this compensating bar is a vertical rack 42 meshing with a pinion on the indicator shaft which carries the hand 43. Thus, when the pendulums swing outwardly the indicator hand moves around the dial 44, which is suitably graduated to indicate the force exerted by the engine being tested.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a dynamometer, in combination, a hydraulic torque transmitting device, pendulum force resisting mechanism connected thereto, and an indicator connected to said pendulum force resisting mechanism.

2. In a dynamometer, a rotatable shaft adapted to be connected to a machine to be tested, a plurality of rotors on said shaft, a casing having passages therein connecting said rotors in a hydraulic circuit, said casing being rotatably mounted on an axis coincident with that of said shaft, means for resisting rotary movement of said casing, and means for indicating the force exerted by said resisting means.

3. In a dynamometer, a rotatable shaft, a series of rotors fixed thereto, a casing rotatably mounted on an axis coincident with that of said shaft, said casing having passages connecting the rotors of said series, said casing also having a passage leading from the last rotor to the first rotor of said series, thereby forming a hydraulic circuit, and pendulum mechanism for resisting movement of said casing.

HALVOR O. HEM.